United States Patent [19]
Nozawa et al.

[11] Patent Number: 5,953,064
[45] Date of Patent: Sep. 14, 1999

[54] IMAGE SIGNAL ENCODING SYSTEM CAPABLE OF CORRECTLY ENCODING AN EDITING IMAGE SIGNAL BEFORE AND AFTER SWITCHING TIME POINTS OF SELECTION OF INPUT DYNAMIC IMAGE SIGNALS

[75] Inventors: Yoshiaki Nozawa; Toshio Koga, both of Tokyo, Japan

[73] Assignee: NEC Corporation, Tokyo, Japan

[21] Appl. No.: 09/083,705

[22] Filed: May 22, 1998

[30] Foreign Application Priority Data

Jun. 2, 1997 [JP] Japan ................................. 9-144246

[51] Int. Cl.$^6$ ........................................................ H04N 7/32
[52] U.S. Cl. ............................ 348/409; 348/384; 348/415
[58] Field of Search ................................... 348/384, 390, 348/400, 401, 402, 409, 415, 416; 382/232, 236, 238

[56] References Cited

U.S. PATENT DOCUMENTS 5,602,592  2/1997  Mori ........................................ 348/415

FOREIGN PATENT DOCUMENTS 2-87789  3/1990  Japan.

Primary Examiner—Bryan Tung
Attorney, Agent, or Firm—Scully, Scott, Murphy & Presser

[57] ABSTRACT

An image signal encoding system which is capable of correctly encoding an editing image signal before and after switching points of a first input dynamic image signal and a second input dynamic image signal. The image signal encoding system selects, as an editing image signal, one of the first and the second input dynamic image signals, each of which has serial image plane frames to encode the editing image signal. A switching signal is produced which is used to select as the editing image signal one of the first and second input dynamic image signals. An image encoder encodes the editing image signal, using spatial correlation, an initial image plane frame of the editing image signal after a switching time point of selection of the first and second input dynamic image signals. The image encoder encodes, using previous forecast in correlation between two successive image plane frames of the serial image plane frames, a final image plane frame before the switching time point of selection of the first and second input dynamic image signals.

2 Claims, 5 Drawing Sheets

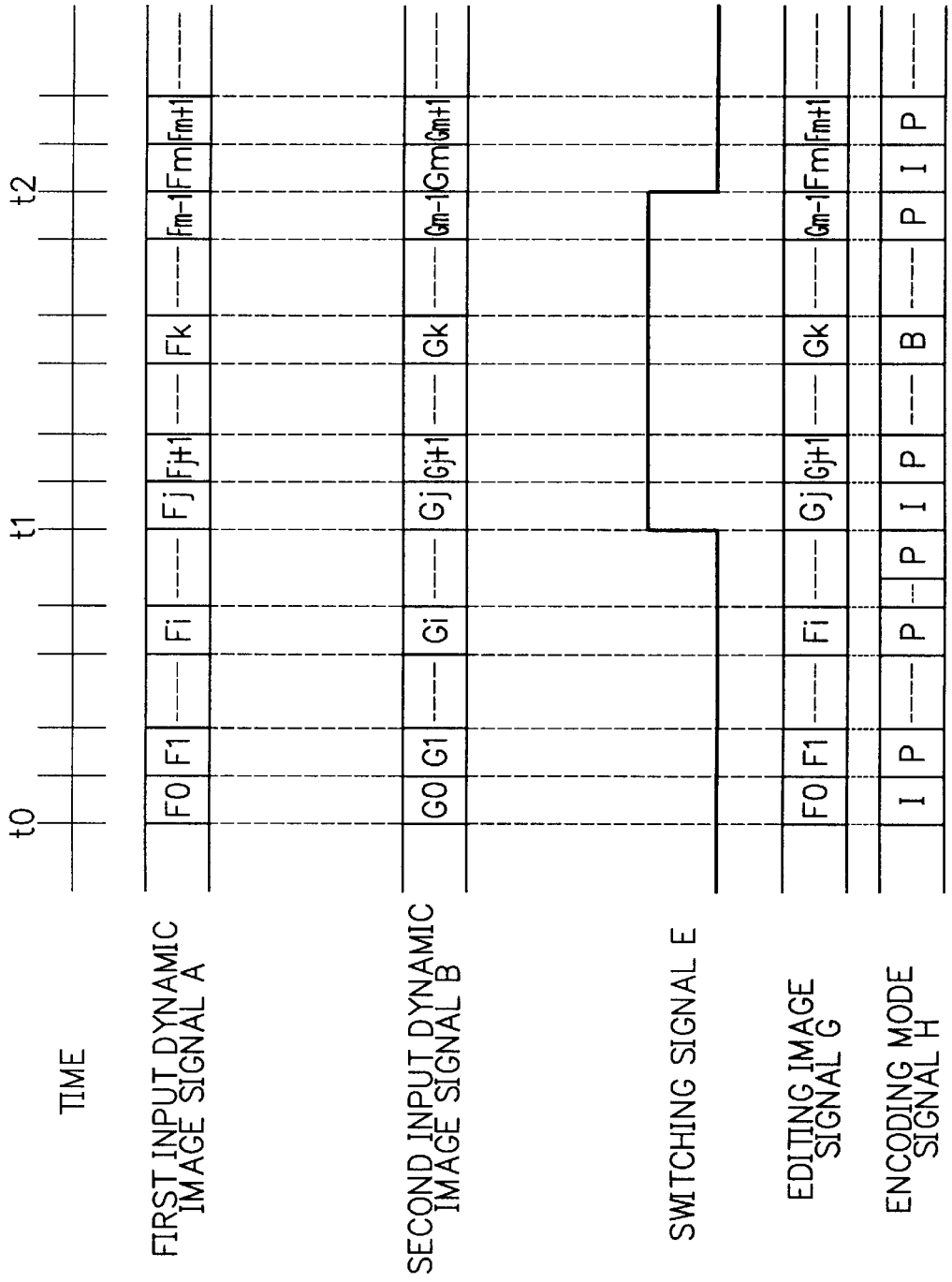

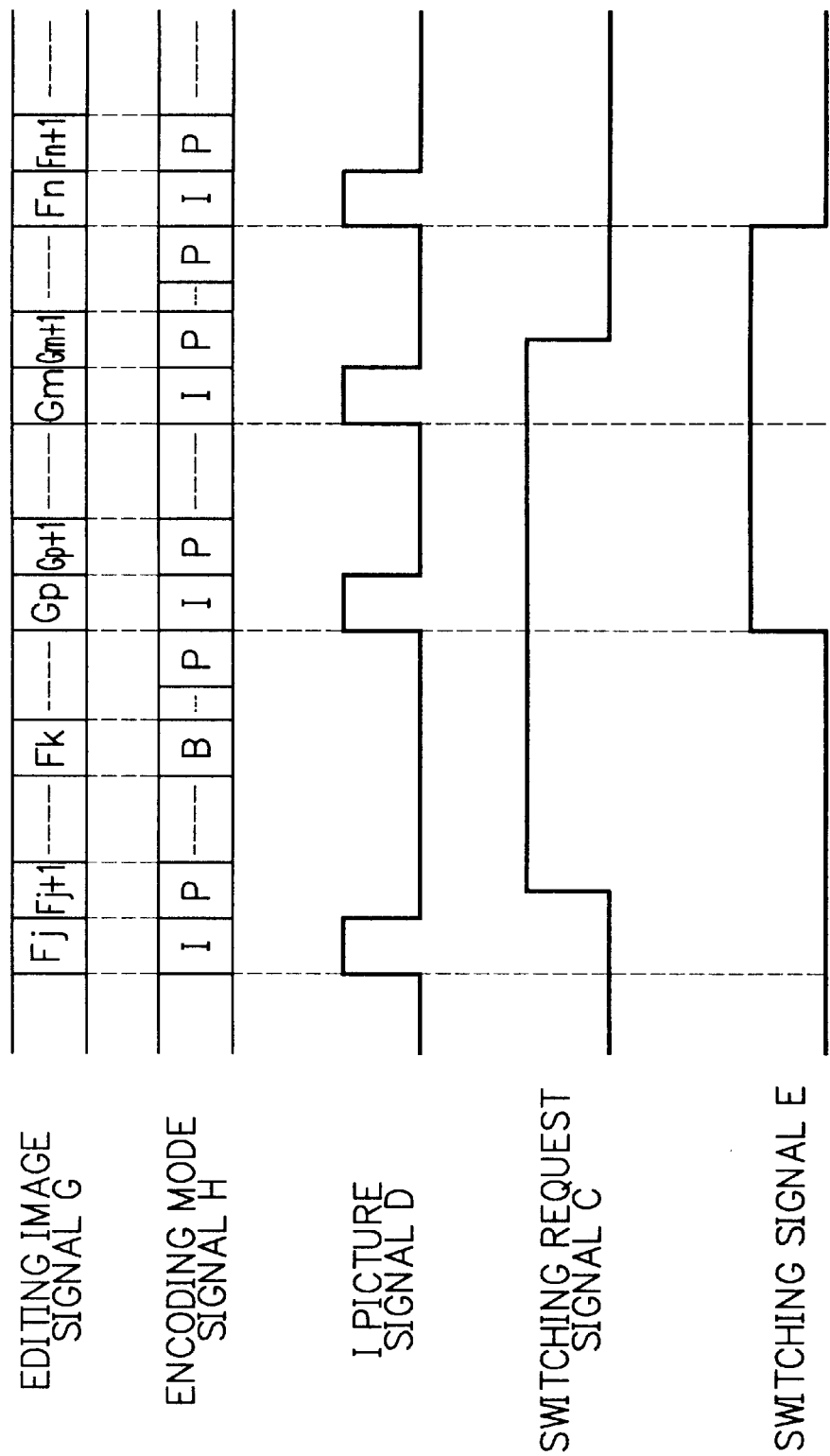

IMAGE SIGNAL ENCODING SYSTEM CAPABLE OF CORRECTLY ENCODING AN EDITING IMAGE SIGNAL BEFORE AND AFTER SWITCHING TIME POINTS OF SELECTION OF INPUT DYNAMIC IMAGE SIGNALS

BACKGROUND OF THE INVENTION

This invention relates to an image signal encoding system which selects, as an editing image signal, one of a first dynamic image signal and a second dynamic image signal to encode the editing image signal.

DESCRIPTION OF THE RELATED ART

In the manner which will later be described more in detail, a first conventional image signal encoding system selects, in response to a switching signal, one of a first input dynamic image signal and a second input dynamic image signal, as an editing image signal.

The first conventional image signal encoding system encodes the editing image signal in response to the encoding mode signal. The first conventional image signal encoding system encodes the editing image signal to produce an encoded output image signal. The image signal encoding system encodes the editing image signal by using only intraframe encoding in response to the I picture mode signal, namely, in an I picture mode. Namely, the image signal encoding system does not execute, in the I picture mode, forecast in correlation between two successive image plane frames of serial image plane frames. The image signal encoding system encodes the editing image signal by using previous forecast in correlation between two successive image plane frames of the serial image plane frames in response to the P picture mode signal, namely, in a P picture mode. The image signal encoding system encodes the editing image signal by using both of previous forecast and backward forecast in correlation between two successive image plane frames of the serial image plane frames in response to the B picture mode signal, in a B picture mode. The I picture mode signal, the P picture mode signal, and the B picture mode signal are periodically changed.

It is assumed that the image signal encoding system selects, as the editing image signal, the second input dynamic image signal from a switching time point t1 to the switching time point t2 in response to the switching signal. The image signal encoding system selects, as the editing image signal, the first input dynamic image signal before the switching time point t1 and after the switching time point t2 in response to the switching signal. In this event, the I picture mode signal, the P picture mode signal, and the B picture mode signal are periodically changed regardless of the switching signal.

A second conventional image signal encoding system is described in Japanese Unexamined Patent Prepublication (koukai) No. 87789/1990. The second conventional image signal encoding system executes fixed forecast between frames in transmitting dynamic image signal for TV telephone conference.

However, in case that the first conventional image signal encoding system encodes, in the P picture mode or the B picture mode, an initial image plane frame of the editing image signal after the switching time point t1, the encoded output image signal has data of both of the first input dynamic image signal and the second input dynamic image signal. As a result, the first conventional image signal encoding system is incapable of correctly encoding the initial image plane frame of the editing image signal after the switching time point t1. Also, in case that the first conventional image signal encoding system encodes, in the B picture mode, a final image plane frame of the editing image signal before the switching time point t2, the encoded output image signal has data of both of the first input dynamic image signal and the second input dynamic image signal. As a result, the first conventional image signal encoding system is incapable of correctly encoding the final image plane frame of the editing image signal before the switching time point t2. Likewise, the second conventional image signal encoding system is incapable of correctly encoding the initial image plane frame of the editing image signal after the switching time point and the final image plane frame of the editing image signal before the switching time point.

SUMMARY OF THE INVENTION

It is therefore an object of this invention to provide an image signal encoding system which is capable of correctly encoding an editing image signal before and after switching points of a first input dynamic image signal and a second input dynamic image signal.

Other objects of this invention will become clear as the description proceeds.

According to a first aspect of this invention, there is provided an image signal encoding system which selects, as an editing image signal, one of a first input dynamic image signal and a second input dynamic image signal each of which has serial image plane frames to encode the editing image signal, the image signal encoding system comprising:

switching signal producing means for producing a switching signal which is used in selection of the one of the first input dynamic image signal and the second input dynamic image signal;

selecting means connected to the switching signal producing means for selecting, as the editing image signal, one of the first input dynamic image signal and the second input dynamic image signal when the selecting means is supplied with the switching signal; and image encoding means connected to the selecting means for encoding the editing image signal, the image encoding means being for encoding, in using spatial correlation, an initial image plane frame of the editing image signal after a switching time point of selection of the first input dynamic image signal and the second input dynamic image signal, the image encoding means being for encoding, in using previous forecast in correlation between two successive image plane frames of the serial image plane frames, a final image plane frame before the switching time point of selection of the first input dynamic image signal and the second input dynamic image signal.

According to a second aspect of this invention, there is provided an image signal encoding system which selects, as an editing image signal, one of a first input dynamic image signal and a second input dynamic image signal each of which has serial image plane frames to encode the editing image signal in an I picture mode, a P picture mode, and a B picture mode in response to an I picture mode signal, a P picture mode signal, and a B picture mode signal, the image signal encoding system comprising:

a change point detecting device for detecting a change point of a switching request signal to produce a change point detecting signal as a B picture ban signal;

an encoding mode determining device connected to the change point detecting device for periodically producing the I picture mode signal, the P picture mode signal, and the B picture mode signal when the encoding mode determining device is not supplied with the B picture ban signal, the encoding mode determining device being for producing an I picture signal in response to the B picture ban signal, the encoding mode determining device being for producing the I picture mode signal in an initial image plane frame of the editing image signal after a switching time point of selection of the first input dynamic image signal and the second input dynamic image signal in response to the B picture ban signal, the encoding mode determining device being for producing the P picture mode signal in a final image plane frame before the switching time point of selection of the first input dynamic image signal and the second input dynamic image signal in response to the B picture ban signal;

a register connected to the encoding mode determining device for producing, by retiming the switching request signal in using the I picture signal which is produced in response to the B picture ban signal, a switching signal which is used in selection of one of the first input dynamic image signal and the second input dynamic image signal;

a selector connected to the register for selecting, as the editing image signal, one of the first input dynamic image signal and the second input dynamic image signal when the selector is supplied with the switching signal; and an image encoding device connected to the encoding mode determining device and to the selector for periodically encoding the editing image signal in the I picture mode, the P picture mode, and the B picture mode when the image encoding device is not supplied with the I picture mode signal and the P picture mode signal which are produced in response to the B picture ban signal, the image encoding device being for encoding, in the I picture mode, the initial image plane frame of the editing image signal after the switching time point of selection of the first input dynamic image signal and the second input dynamic image signal in response to the B picture ban signal, the image encoding device being for encoding, in the P picture mode, the final image plane frame before the switching time point of selection of the first input dynamic image signal and the second input dynamic image signal in response to the B picture ban signal.

BRIEF DESCRIPTION OF THE DRAWINGS

FIG. 4 is a view for use in describing an operation of the image signal encoding system illustrated in FIG. 3; and FIG. 5 is another view for use in describing the operation of the image signal encoding system illustrated in FIG. 3.

DESCRIPTION OF THE PREFERRED EMBODIMENT

Figure 1:
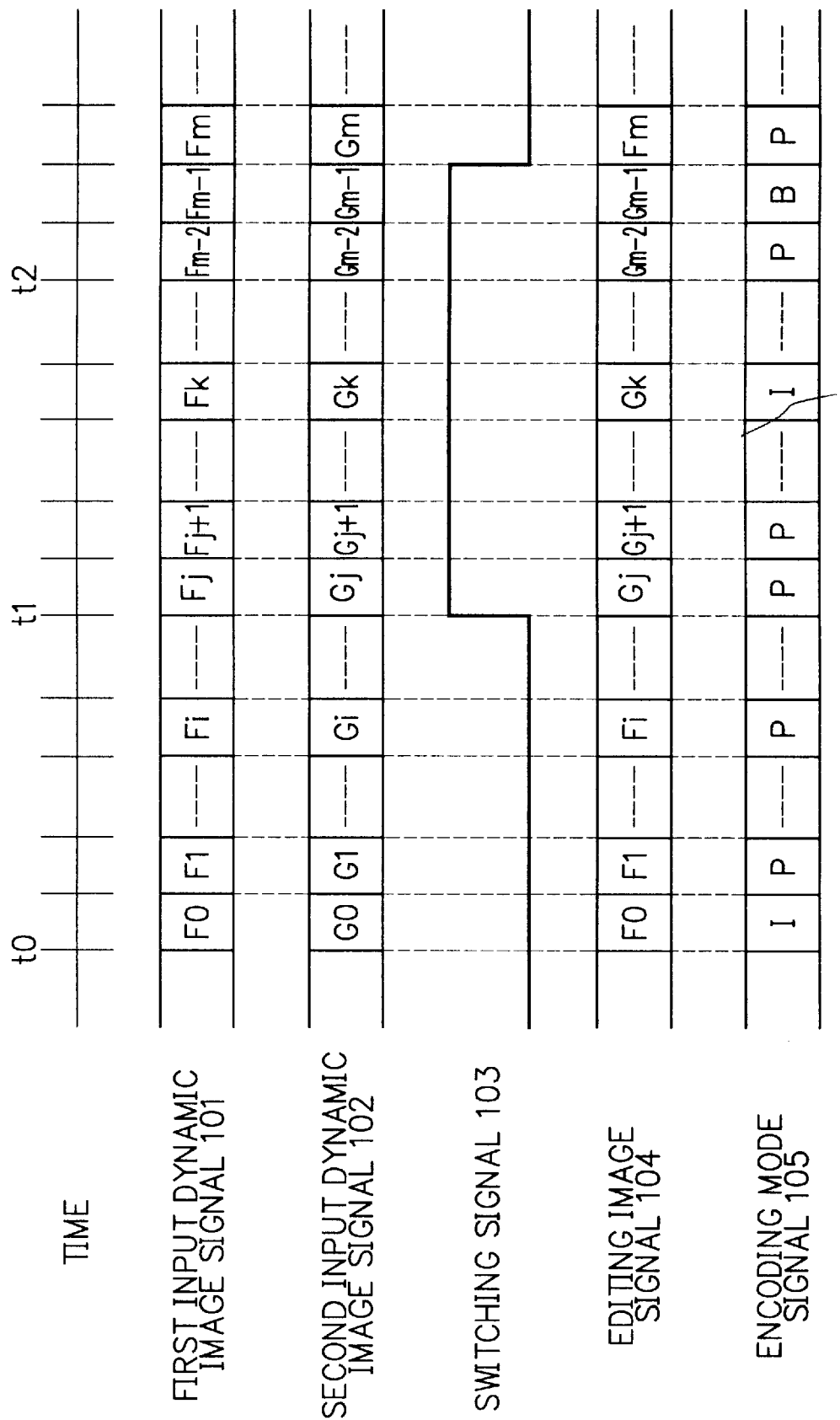
FIG. 1 is a view for use in describing an operation of a first conventional image signal encoding system.
Figure 2:
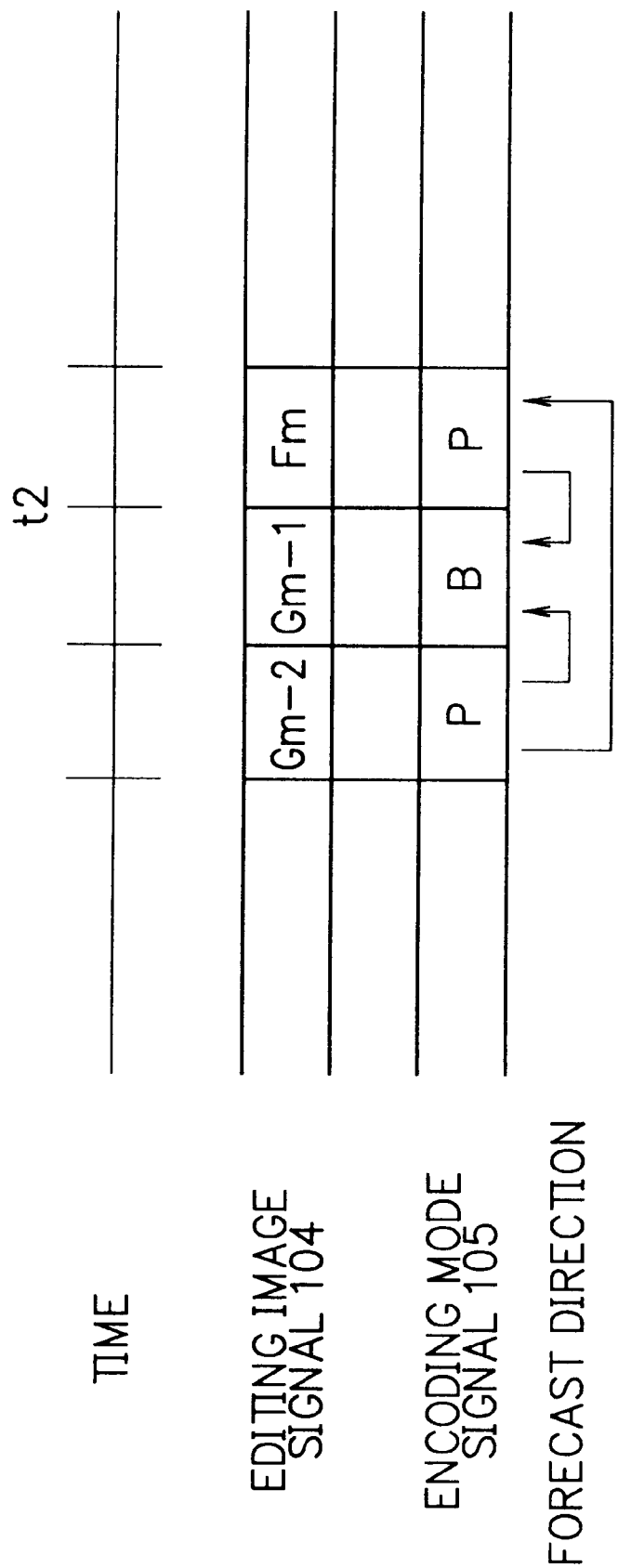
FIG. 2 is another view for use in describing the operation of the first conventional image signal encoding system.

Referring to FIGS. 1 and 2, a first conventional image signal encoding system will be described for a better understanding of this invention. In FIG. 1, the first conventional image signal encoding system selects, in response to a switching signal 103, one of a first input dynamic image signal 101 and a second input dynamic image signal 102, as an editing image signal 104. Each of t1 and t2 represents switching time point of selection of the first input dynamic image signal 101 and the second input dynamic image signal 102.

For example, the first input dynamic image signal 101 has serial image plane frames F0, F1, Fi, Fj, Fj+1, Fk, Fm−1, and Fm. The second input dynamic image signal 102 has serial image plane frames G0, G1, Gi, Gi, Gj+1, Gk, Gm−1, and Gm. The editing image signal 104 has serial image plane frames F0, F1, Fi, Gi, Gj+1, , Gk, Gm−1, and Fm. An encoding mode signal 105 has the I picture signals I, the P picture signals P, and the B picture signals B.

The first conventional image signal encoding system encodes the editing image signal 104 in response to the encoding mode signal 105. The first conventional image signal encoding system encodes the editing image signal 104 to produce an encoded output image signal. The image signal encoding system encodes the editing image signal 104 by using only intraframe encoding in response to the I picture mode signal I, namely, in an I picture mode. Namely, the image signal encoding system does not execute, in the I picture mode, forecast in correlation between two successive image plane frames of serial image plane frames. The image signal encoding system encodes the editing image signal 104 by using previous forecast in correlation between two successive image plane frames of serial image plane frames in response to the P picture mode signal, namely, in a P picture mode. The image signal encoding system encodes the editing image signal 104 by using both of previous forecast and backward forecast in correlation between two successive image plane frames of serial image plane frames in response to the B picture mode signal, in a B picture mode. The I picture mode signal, the P picture mode signal, and the B picture mode signal are periodically changed.

The image signal encoding system selects, as the editing image signal 104, the second input dynamic image signal 102 from the switching time point t1 to the switching time point t2. The image signal encoding system selects, as the editing image signal 104, the first input dynamic image signal 101 before the switching time point t1 and after the switching time point t2. In this event, the I picture mode, the P picture mode signal, and the B picture mode signal are periodically changed regardless of the switching signal.

In case of executing broadcast service, for example, the second input dynamic image signal 102 is used as a main program, and the first input dynamic image signal 101 is used as a duplicate program such as a commercial. In this event, each of local broadcasting station is capable of independently using the duplicate program.

A second conventional image signal encoding system is described in Japanese Unexamined Patent Prepublication (koukai) No. 87789/1990. The second conventional image signal encoding system executes fixed forecast between frames in transmitting dynamic image signal for TV telephone conference. The conventional image signal encoding system comprises a plurality of frame memory devices which are used for encoding the frame by fixed forecast between frames in transmitting dynamic image signal for TV telephone conference.

However, in case that the first conventional image signal encoding system encodes, in the P picture mode or the B picture mode, an initial image plane frame of the editing image signal 104 after the switching time point t1, the encoded output image signal has data of both of the first input dynamic image signal 101 and the second input dynamic image signal 102. As a result, the first conventional image signal encoding system is incapable of correctly encoding the initial image plane frame of the editing image signal 104 after the switching time point t1. Also, in case that the first conventional image signal encoding system encodes, in the B picture mode, a final image plane frame of the editing image signal 104 before the switching time point t2, the encoded output image signal has data of both of the first input dynamic image signal 101 and the second input dynamic image signal 102 as shown in FIG. 2. As a result, the first conventional image signal encoding system is incapable of correctly encoding the final image plane frame of the editing image signal G before the switching time point t2. Likewise, the second conventional image signal encoding system is incapable of correctly encoding the initial image plane frame of the editing image signal after the change time point and the final image plane frame of the editing image signal before the switching time point.

Figure 3:
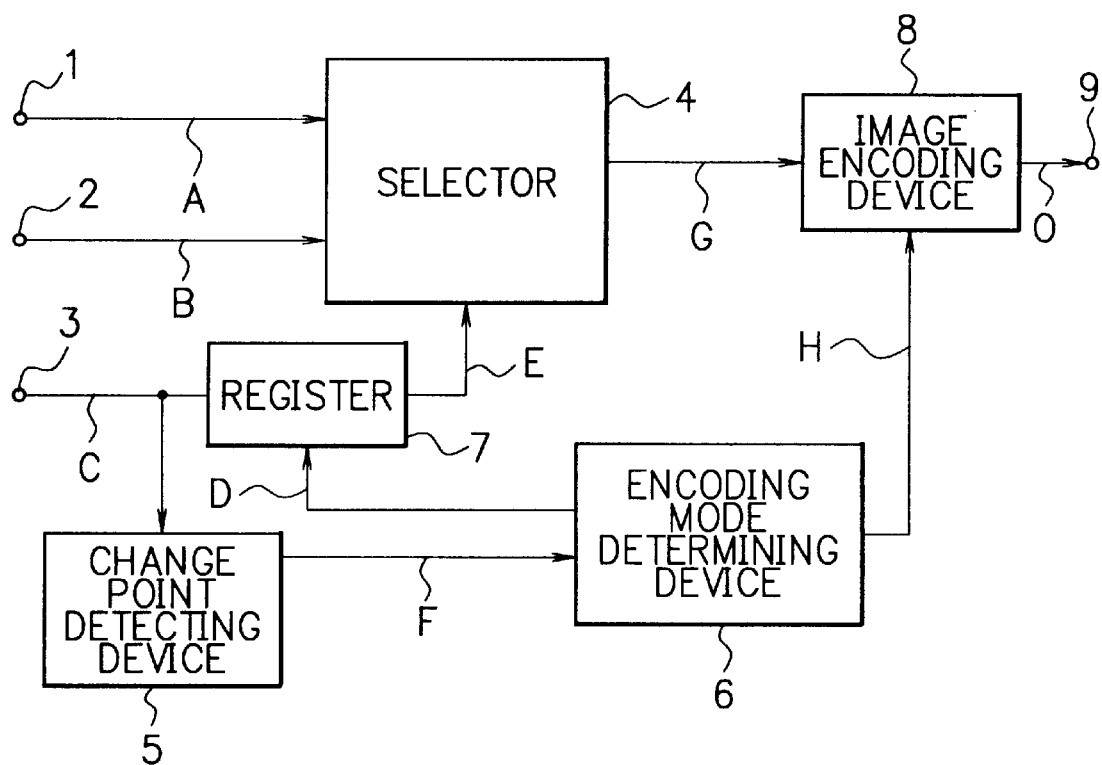
FIG. 3 is a block diagram of an image signal encoding system according to a first embodiment of this invention.

Referring to FIGS. 3, 4, and 5, the description will proceed to an image signal encoding system according to a preferred embodiment of this invention.

The image signal encoding system comprises a first input terminal 1, a second input terminal 2, a third input terminal 3, a selector 4, a change point detecting device 5, an encoding mode determining device 6, a register 7, an image encoding device 8, and an output terminal 9. The selector 4 is connected to the first input terminal 1, to the second input terminal 2, and to the register 7. The change point detecting device 5 is connected to the third input terminal 3.

The encoding mode determining device 6 is connected to the change point detecting device 5. The register 7 is connected to the third input terminal 3 and to the encoding mode determining device 6. The image encoding device 8 is connected to the selector 4, to the encoding mode determining device 6, and to the output terminal 9.

The first input terminal 1 is supplied with a first input dynamic image signal A. The second input terminal 2 is supplied with a second input dynamic image signal B. The third input terminal 3 is supplied with a switching request signal C. The selector 4 is supplied with the first input dynamic image signal A, the second input dynamic image signal B, and a switching signal B from the register 7. The selector 4 selects, as an editing image signal G, one of the first input dynamic image signal A and the second input dynamic image signal B in response to the switching signal E.

The change point detecting device 5 is supplied with the switching request signal C. The change point detecting device 5 detects a change point of a switching request signal C to produce a change point detecting signal, as a B picture ban signal F.

The encoding mode determining device 6 produces an encoding mode signal H which has one of an I picture mode signal, a P picture mode signal, and a B picture mode signal. The encoding mode determining device 6 supplies the encoding mode signal H to the image encoding device 8. The encoding mode determining device 6 is supplied with the B picture ban signal F from the change point detecting device 5. Also, the encoding mode determining device 6 produces an I picture signal D in response to the B picture ban signal F and supplies the I picture signal D to the register 7. In addition, the encoding mode determining device 6 produces the P picture mode signal, in response to the B picture ban signal F, when the image encoding device 8 encodes a final image plane frame of the editing image signal G before a switching time point of selection of the first input dynamic image signal A and the second input dynamic image signal B. Also, the encoding mode determining device 6 produces the I picture mode signal, in response to the B picture ban signal F, when the image encoding device 8 encodes an initial image plane frame of the editing image signal G after the switching time point of selection of the first input dynamic image signal A and the second input dynamic image signal B.

The register 7 is supplied with the switching request signal C from the third input terminal 3 and the I picture signal D from the encoding mode determining device 6. The register 7 produces, by retiming the switching request signal C in using the I picture signal D, the switching signal E which is used in selection of the one of the first input dynamic image signal A and the second input dynamic image signal B.

The image encoding device 8 encodes the editing image signal from the selector 4 in response to the encoding mode signal H from the encoding mode determining device 6 to produce and supply an encoded output image signal 0 to the output terminal 9. Also, the image encoding device 8 encodes the final image plane frame of the editing image signal G before the switching time point of selection of the first input dynamic image signal A and the second input dynamic image signal B in response to the P picture mode signal which is produced, by the encoding mode determining device 6, in response to the B picture ban signal F. In addition, the image encoding device 8 encodes the initial image plane frame of the editing image signal G after the switching time point of selection of the first input dynamic image signal A and the second input dynamic image signal B in response to the I picture mode signal which is produced, by the encoding mode determining device 6, in response to the B picture ban signal F.

Referring to FIGS. 4 and 5, the description will proceed to an operation of the image signal encoding system. In FIGS. 4 and 5, t1 and t2 represent the switching time points of selection of the first input dynamic image signal A and the second input dynamic image signal B. For example, the first input dynamic image signal A has serial image plane frames F0, F1, Fi, Fi, Fj+1, Fk, Fm−1, Fm, and Fm+1. The second input dynamic image signal B has serial image plane frames G0, G1, Gi, Gi, Gj+1, Gk, Gm−1, Gm, and Gm+1. The editing image signal G has serial image plane frames F0, F1, Fi, Gi, Gj+1, Gk, Gm−1, Fm, and Fm+1. The encoding mode signal H has the I picture signals I, the P picture signals P, and the B picture signals B.

The encoding mode signal H is set at the P picture mode signal in the final image plane frame G before each of the switching time points t1 and t2. Also, the encoding mode signal H is set at the I picture mode signal in the initial image plane frame of the editing image signal G after each of the switching time points t1 and t2. As shown in FIG. 5, the switching signal E is produced by retiming the switching request signal C in using the I picture signal.

Thus, the image signal encoding system selects, as the editing image signal G, one of the first input dynamic image signal A and the second input dynamic image signal B each of which has serial image plane frames to encode the editing image signal G by using spatial correlation, by using correlation between two successive image planes, and by using both of spatial correlation and correlation between two successive image planes.

In addition, the image signal encoding system encodes the initial image plane frame of the editing image signal G after the switching time point of selection of the first input dynamic image signal A and the second input dynamic image signal B in response to the I picture mode signal which is produced, by the encoding mode determining device 6, in response to the B picture ban signal F. Also, the image signal encoding system encodes the final image plane frame of the editing image signal G before the switching time point of selection of the first input dynamic image signal A and the second input dynamic image signal B in response to the P picture mode signal which is produced, by the encoding mode determining device 6, in response to the B picture ban signal F. As a result, the encode output image signal 0 has data of only one of the first input dynamic image signal A and the second input dynamic image signal B. Therefore, the image signal encoding system is capable of correctly encoding the editing image signal G before and after the switching time point of selection of the first input dynamic image signal A and the second input dynamic image signal B.

What is claimed is:

1. An image signal encoding system which selects, as an editing image signal, one of a first input dynamic image signal and a second input dynamic signal, each of which has serial image plane frames to encode said editing image signal, said image signal encoding system comprising:

switching signal producing means for producing a switching signal which is used in selection of said one of said first input dynamic image signal and said second input dynamic image signal;

selecting means connected to said switching signal producing means for selecting, as said editing image signal, one of said first input dynamic image signal and said second input dynamic image signal when said selecting means is supplied with said switching signal;

image encoding means connected to said selecting means for encoding said editing image signal, said image encoding means being for encoding, using spatial correlation, an initial image plane frame of said editing image signal after a switching time point of selection of said first input dynamic image signal and said second input dynamic image signal, said image encoding means being for encoding, using previous forecast in correlation between two successive image plane frames of serial image plane frames, a final image plane frame before said switching time point of selection of said first input dynamic image signal and said second input dynamic image signal;

said switching means, selecting means and image encoding means selecting for encoding an initial image plane frame, after a switching time point, from only one of the first input dynamic signal and the second input dynamic signal, and selecting for encoding a final image plane frame, before a switching time point, from only one of the first input dynamic signal and the second input dynamic signal.

2. An image signal encoding system which, selects, as an editing image signal, one of a first input dynamic image signal and a second input dynamic image signal each of which has serial image plane frames to encode said editing image signal in an I picture mode, a P picture mode, and a B picture mode in response to an I picture mode signal, a P picture mode signal, and a B picture mode signal, said image signal encoding system comprising:

a change point detecting device for detecting a change point of a switching request signal to produce a change point detecting signal as a B picture ban signal;

an encoding mode determining device connected to said change point detecting device for periodically producing said I picture mode signal, said P picture mode signal, and said B picture mode signal when said encoding mode determining device is not supplied with said B picture ban signal, said encoding mode determining device being for producing an I picture signal in response to said B picture ban signal, said encoding mode determining device being for producing said I picture mode signal in an initial image plane frame of said editing image signal after a switching time point of selection of said first input dynamic image signal and said second input dynamic image signal in response to said B picture ban signal, said encoding mode determining device being for producing said P picture mode signal in a final image plane frame before said switching time point of selection of said first input dynamic image signal and said second input dynamic image signal in response to said B picture ban signal;

a register connected to said encoding mode determining device for producing, by retiming said switching request signal in using said I picture signal which is produced in response to said B picture ban signal, a switching signal which is used in selection of said one of said first input dynamic image signal and said second input dynamic image signal;

a selector connected to said register for selecting, as said editing image signal, said one of said first input dynamic image signal and said second input dynamic image signal when said selector is supplied with said switching signal; and an image encoding device connected to said encoding mode determining device and to said selector for periodically encoding said editing image signal in said I picture mode, said P picture mode, and said B picture mode when said image encoding device is not supplied with said I picture mode signal and said P picture mode signal which are produced in response to said B picture ban signal, said image encoding device being for encoding, in said I picture mode, said initial image plane frame of said editing image signal after said switching time point of selection of said first input dynamic image signal and said second input dynamic image signal in response to said B picture ban signal, said image encoding device being for encoding, in said P picture mode, said final image plane frame before said switching time point of selection of said first input dynamic image signal and said second input dynamic image signal in response to said B picture ban signal.

* * * * *